United States Patent
Murakoshi et al.

(10) Patent No.: US 6,901,031 B2
(45) Date of Patent: May 31, 2005

(54) STROKE INFORMATION MEASURING INSTRUMENT AND STROKE INFORMATION MEASURING METHOD

(75) Inventors: Takahiro Murakoshi, Hamamatsu (JP);
Yuuichi Kimura, Hamamatsu (JP);
Takehiro Kurono, Hamamatsu (JP)

(73) Assignee: Hamamatsu Photonics K.K., Shizuoka (JP)

(*) Notice: Subject to any disclaimer, the term of this patent is extended or adjusted under 35 U.S.C. 154(b) by 0 days.

(21) Appl. No.: 10/492,518

(22) PCT Filed: Oct. 10, 2002

(86) PCT No.: PCT/JP02/10547
§ 371 (c)(1),
(2), (4) Date: Apr. 14, 2004

(87) PCT Pub. No.: WO03/033087
PCT Pub. Date: Apr. 24, 2003

(65) Prior Publication Data
US 2004/0201675 A1 Oct. 14, 2004

(30) Foreign Application Priority Data
Oct. 15, 2001 (JP) ........................................ 2001-316980

(51) Int. Cl.[7] ............................ G04B 47/00; G06K 9/00
(52) U.S. Cl. ........................ 368/10; 368/113; 382/106; 382/107; 382/190; 382/291
(58) Field of Search ............ 368/10, 113; 345/418–420; 382/106, 107, 190, 291

(56) References Cited

U.S. PATENT DOCUMENTS 5,852,672 A * 12/1998 Lu .............................. 382/154
5,923,773 A * 7/1999 Oshima ........................ 382/154
6,049,625 A * 4/2000 Sakamoto ..................... 382/154
6,169,966 B1 1/2001 Miura et al. .................. 702/142

FOREIGN PATENT DOCUMENTS

| JP | S61-44977 | 11/1984 |
| JP | 60-148574 | 8/1985 |
| JP | 01-270882 | 10/1989 |
| JP | 02-235481 | 9/1990 |
| JP | 06-174450 | 6/1994 |
| JP | 07-135586 | 5/1995 |
| JP | 07-325335 | 12/1995 |
| JP | 08-171693 | 7/1996 |
| JP | 08-317277 | 11/1996 |
| JP | 11-159173 | 6/1999 |
| JP | 11-271024 | 10/1999 |
| JP | 2000-003450 | 1/2000 |
| JP | 2000-042161 | 2/2000 |
| WO | WO 94/29670 | 12/1994 |

* cited by examiner

*Primary Examiner*—Vit W. Miska
(74) *Attorney, Agent, or Firm*—Morgan Lewis & Bockius LLP

(57) ABSTRACT

A stroke information measuring device according to the present invention comprises an imaging section 4 capturing image data of every predetermined time of a swimmer who is swimming, a pixel extracting section 18 extracting pixels corresponding to the body image, a profile data generating section 20 performing the integration of the body image in a predetermined direction and generating the profile data, an end point extracting section 24 extracting the end point of each profile data, a stroke point extracting section 26 extracting the stroke point corresponding to the predetermined posture of the swimmer based on the periodic movement of each end point, and a calculating section 28 calculating the stroke information based on the stroke point.

14 Claims, 7 Drawing Sheets

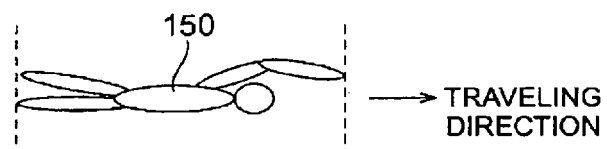
Fig.4A
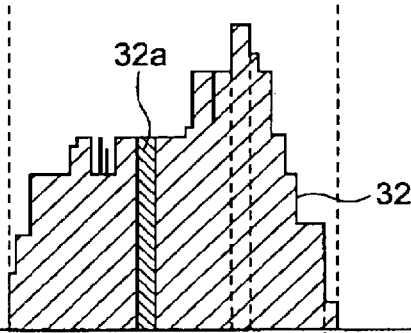
Fig.4B
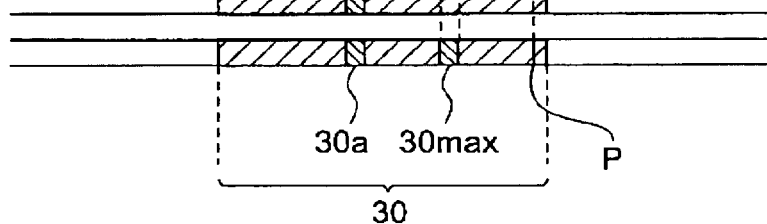
Fig.4C
Fig.5
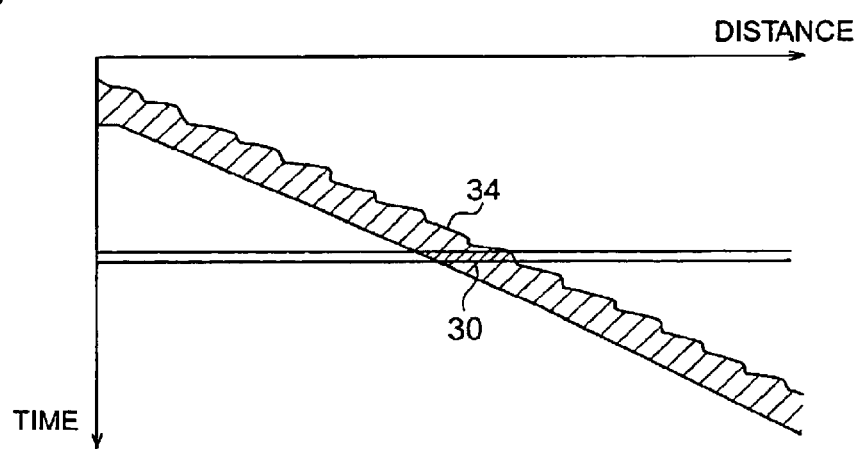

STROKE INFORMATION MEASURING INSTRUMENT AND STROKE INFORMATION MEASURING METHOD

FIELD OF THE ART

This invention relates to a stroke information measuring device and a stroke information measuring method for measuring time required for each stroke of a swimmer who is swimming and the distance advanced by each stroke or the like by capturing images of a swimmer.

BACKGROUND ART

In swimming race, a pace-setting of swimmer is one of the important elements for improving the swimming race ability. There is, therefore, a need for the measurement of stroke information such as the time (hereinafter, referred to as "stroke time") required for each stroke of a swimmer and the traveling distance (hereinafter, referred to as "stroke distance") by each stroke.

In the measurement of such stroke information, a person captures images of a swimmer who is swimming by using a video or the like, and measures the stroke information by using a stopwatch while watching the video image. In this manner, the conventional measurement of stroke information is dependent on manual work.

As a technique for measuring stroke information, J P 2000-42161A discloses a technique in that an operator pushes a switch at each predetermined phase of the periodic repeated movement of a person (for example, a swimmer) to be measured while observing the movement of the person to be measured, and the cycle or the like of the periodic movement is calculated.

JP H11-159173A discloses a motion capture for capturing the movement of a swimmer who is swimming.

DISCLOSURE OF THE INVENTION

However, a problem exists in that since the above measurement using the stopwatch is dependent on manual work and spent time and effort, thereby taking much time to feedback the measuring results to the swimmer.

In the technique described in JP 2000-42161A, since the detection of a predetermined phase in the periodic movement of the person to be measured is dependent on the operator, measurement accuracy is dependent on the degree of skill of the operator and an error may be caused by a rate of reaction or the like. In particular, since each part of the body of a swimmer is hidden by water droplets and is dived under water when swimming, the above error may be larger.

On the other hand, JP H11-159173A discloses a swimming pool for training. However, the above publication does not specifically disclose a means for measuring and how measurement performs is unclear.

The present invention has been accomplished in view of the foregoing. It is an object of the present invention to provide a stroke information measuring device capable of accurately measuring the stroke time and stroke distance of a swimmer who is swimming and in real time and a stroke information measuring method.

To achieve the above object, a stroke information measuring device according to the present invention which captures images of a swimmer during swimming by using an imaging means and measures the stroke information of the swimmer based on the image data obtained, the stroke information measuring device comprising: a pixel extracting means for extracting pixels corresponding to the image of the body of a swimmer in each image data obtained; a profile data generating means for performing the integration of the pixels corresponding to the image of the body extracted by the pixel extracting means in a predetermined direction and generating the profile data corresponding to the body image; an end point extracting means for extracting an end point of the body image from the profile data; and a stroke point extracting means for extracting a stroke point as the end point corresponding to the predetermined posture of a swimmer who is swimming based on the periodic movement of the end point.

Also, a stroke information measuring method according to the present invention which measures the stroke information of a swimmer who is swimming, the method comprising the steps of: (1) capturing images of a swimmer during swimming to obtain image data of every predetermined time; (2) extracting the pixels corresponding to the body image of a swimmer from each image data obtained; (3) performing the integration of the pixels corresponding to the image of the body extracted in a predetermined direction to generate the profile data corresponding to the image of the body; (4) extracting the end point of the body image from the profile data; and (5) extracting a stroke point as the end point corresponding to the predetermined posture of a swimmer who is swimming based on the periodic movement of the end point.

In all of the modern four types of swimming races (free-style, backstroke, breaststroke and butterfly), the swimmer who is swimming performs periodic movement having one cycle of one stroke. Therefore, each part of the body is moved periodically according to the stroke. Therefore, by employing the above configuration, if the end point corresponding to prescribed posture position of the image of the body is extracted at every predetermined time, the waveform formed by each end point changes periodically according to each stroke of the swimmer. On the other hand, the end point when the swimmer is in a predetermined posture for each stroke can be extracted based on the periodic movement of each end point. The information related to the stroke can be analyzed based on this method.

Therein, the integration of the pixels corresponding to the image of the body can be performed along the traveling direction of the swimmer and/or the direction vertical to the traveling direction when generating the profile data. This is so because the periodic change in the direction of the body image is large for each swimming stroke, and the detection thereof is easy.

The swimming-speed of a swimmer is preferably calculated based on the movement of the end point located at the front end in the traveling direction of a swimmer. This is so because the split time and swimming-speed between the any given positions of a swimmer can be measured.

It is preferable that a comparison is performed for each stroke by calculating at least one of the time for each stroke of a swimmer, traveling distance for each stroke and average swimming-speed for each stroke based on the stroke point extracted.

The start and the turn can be evaluated by calculating the time required for the start and the traveling distance at the start based on the stroke point previously extracted after the swimmer starts, or by calculating the time required for a turn and the traveling distance at a turn based on the stroke point extracted just before and just after the turn of the swimmer.

BRIEF DESCRIPTION OF THE DRAWINGS

FIGS. 4A to 4C are illustrations of H profile data;

FIG. 5 is a D-T map showing the profile data group;

BEST MODE FOR CARRYING OUT THE INVENTION

Figure 1:
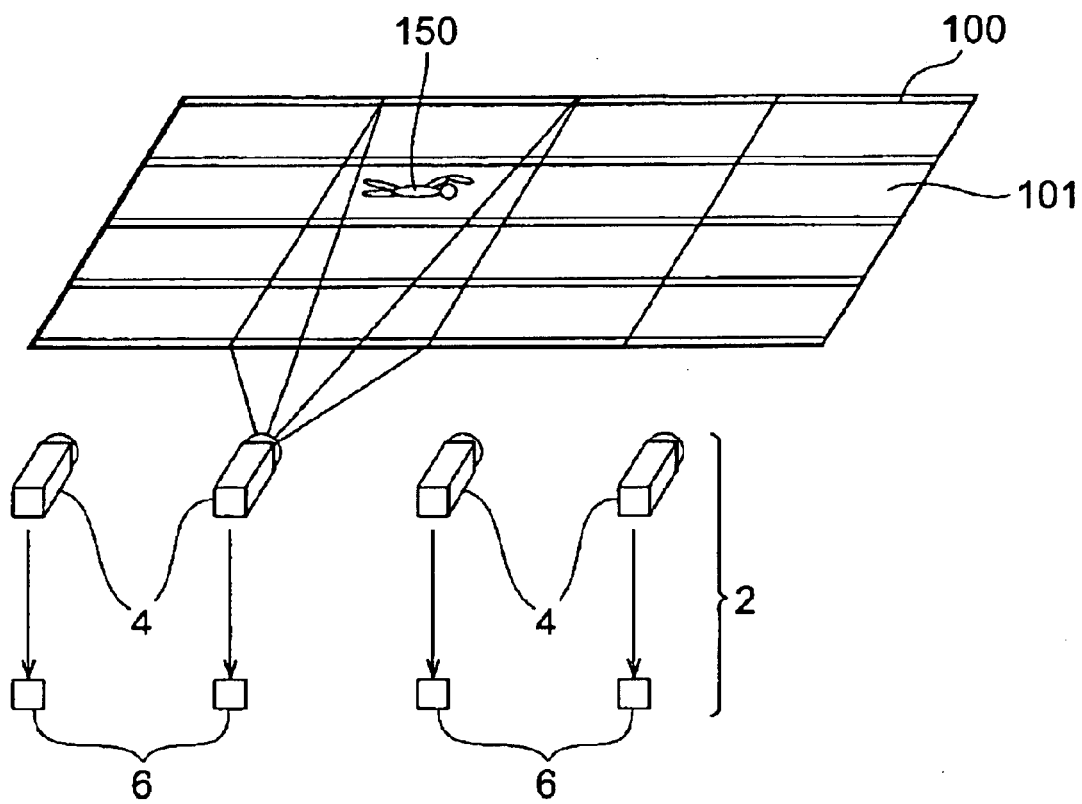
FIG. 1 is an illustration of the arrangement of an imaging section in a stroke information measuring device according to the present invention.

Hereinafter, the preferred embodiment of the present invention will be described in detail with reference to the drawings. To facilitate the comprehension of the explanation, the same reference numerals denote the same parts, where possible, throughout the drawings, and a repeated explanation will be omitted. The scale in the drawings does not necessarily correspond to that of the description.

Figure 2:
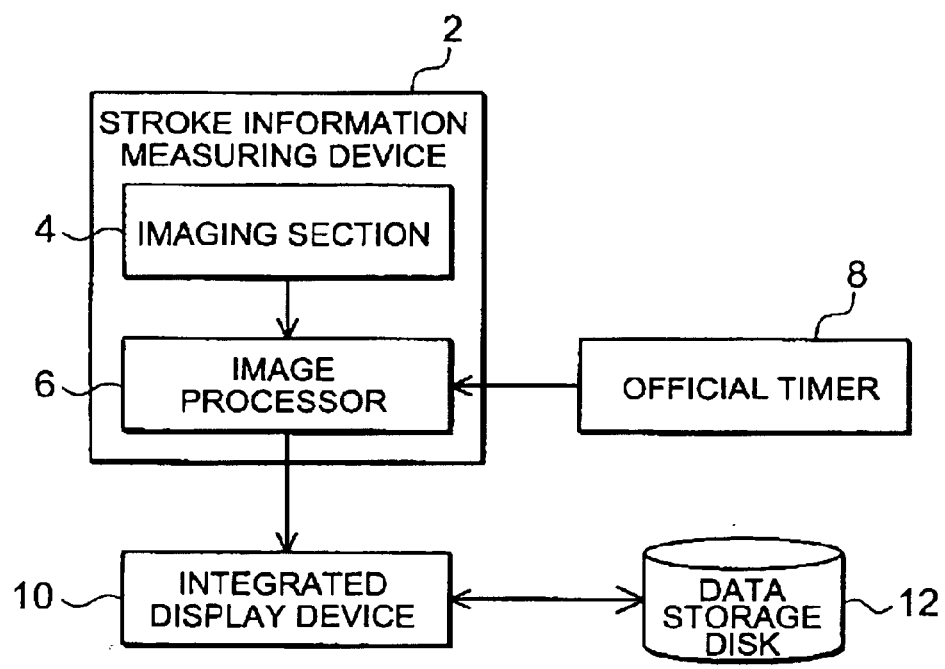
FIG. 2 is a block diagram showing the configuration of the stroke information measuring device and related device.

FIG. 1 is an illustration of the arrangement of an imaging section 4 in a stroke information measuring device 2 according to the embodiment of the present invention. FIG. 2 is a block diagram showing the configuration of the stroke information measuring device 2 and a related device.

As shown in FIG. 1, a stroke information measuring device 2 captures images of a swimmer 150 who is swimming in a lane 101 of a pool 100 by using an imaging section 4 (imaging means), and applies image processing to the image data output from the imaging section 4 by using an image processor 6 to measure stroke information such as stroke time and stroke distance. The imaging section 4 comprises fixed cameras arranged on a pool side such as a stand, and a plurality of image sections 4 are arranged at an equal interval along the direction of the lane 101 of the pool 100. The image processor 6 is respectively arranged for each imaging section 4. Thereby, images of the swimmer 150 who is swimming can be continuously taken and the stroke information can be continuously measured. The imaging section 4 may be any component which can continuously capture images of the swimmer 150 who is swimming such as a moving camera following the travel of the swimmer 150.

The image data output from the imaging section 4 is obtained by A/D-converting NTSC (National Television System Committee) composite video signals, and the image data has a size of 640×480, RGB 24 bit. The image data is transferred to the image processor 6 for each frame (that is, every 1/30 seconds) in a DMA (Direct Memory Access) mode. At this time, if odd number and even number fields are separately processed as the image data, time resolution can be improved.

As shown in FIG. 2, the stroke information measuring device 2 is provided with the above imaging section 4 and the image processor 6. The image processor 6 receives the signal showing the official time output from an official timer 8 and corrects the stroke time. The stroke information measured by the image processor 6 is output to a integrated display device 10, and is immediately displayed on a display with which the integrated display device 10 is provided. The stroke information measured can be stored on a data storage disk 12 via the integrated display device 10.

Figure 3:
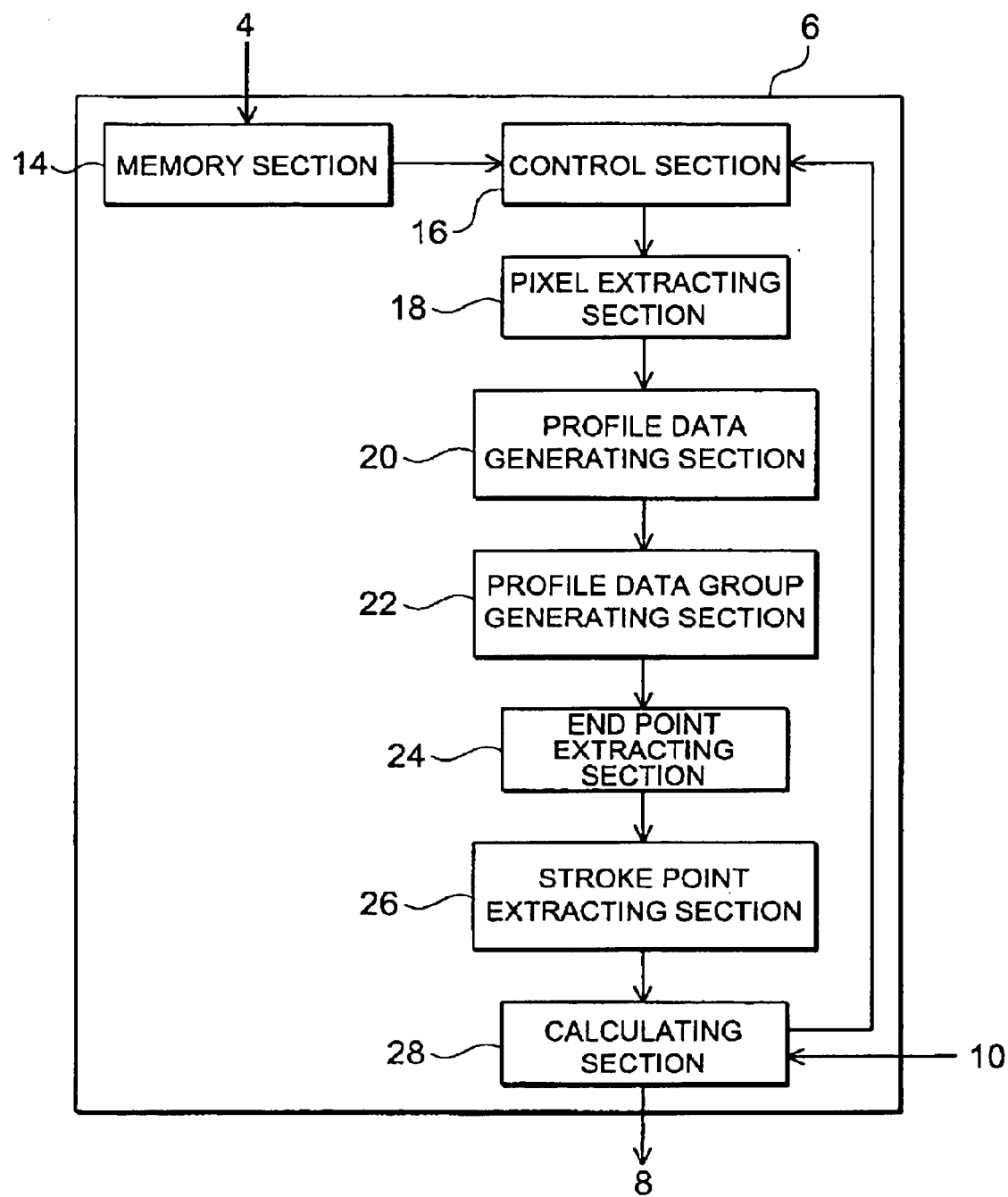
FIG. 3 is a block diagram showing the configuration of an image processor in the device shown in FIG. 2.

Next, the configuration of the image processor 6 will be described in detail. FIG. 3 is a block diagram showing the configuration of an image processor 6. The image processor is provided with a memory section 14 storing the image data output at each frame from the imaging section 4, a control section 16 controlling the processing timing of the image data stored in the memory section 14, a pixel extracting section 18 (pixel extracting means) extracting the pixel corresponding to the image of the body of the swimmer in each image data, a profile data generating section 20 (profile data generating means) performing the integration of the pixel extracted in the direction vertical to the traveling direction of the swimmer and generating the profile data, a profile data group generating section 22 (profile data group generating means) arranging each profile data generated in the output order of the image data and generating the profile data group.

Further, the image processor 6 is provided with an end point extracting section 24 (end point extracting means) extracting the end point (hereinafter, referred to as "front end point") corresponding to the end part in the traveling direction of the swimmer for each profile data, a stroke point extracting section 26 (stroke point extracting means) extracting a front end point when the swimmer is in a predetermined posture for each stroke as a stroke point from each front end point based on the periodic change in the waveform formed by the front end point extracted in the profile data group, and a calculating section 28 (calculating means) calculating the stroke information of the swimmer based on the stroke point extracted.

In all of the modern four types of swimming races, (free-style, backstroke, breaststroke and butterfly), the measurement of stroke information according to the present invention is based on the periodic movements of both end parts of the body in the traveling direction of a swimmer who is swimming and both end parts of the body in the direction vertical to the traveling direction for each stroke. Therefore, if the end point corresponding to either end part of the image of the body is extracted at every predetermined time, the end point when the swimmer is in a predetermined posture for each stroke from each end point can be extracted as a stroke point based on the periodic change according to each stroke of the waveform formed by each end point.

The end point in the traveling direction of the swimmer, that is, front end point is extracted as the end point corresponding to end part of the image of the body in the image processor 6 according to the embodiment. This is so because the reference point of the timing of the stroke is generally the timing when the head rises highest in case of the breaststroke and the timing when arm lands in water in other cases.

Each configuration of the abovementioned image processor 6 will be described in detail.

The control section 16 monitors the capturing condition of the image data stored in image memory section 14. The control section 16 makes the pixel extracting section 18 start the processing of the image data based on the signal showing the end of the processing from the calculating section 28 when the capturing is finished.

The pixel extracting section 18 executes RGB/HSV (Red, Green, Blue/Hue, Saturation, Value) conversion of all pixels in each image data, make all pixels into binaries of the pixel corresponding to the image of the body and other pixels based on hue value, and extracts the pixel corresponding to the image of the body. The pixel extracting section 18 may make all pixels into binaries based on the spectral wavelength and brightness value.

The profile data generating section 20 performs the integration of the pixel corresponding to the image of the body extracted by the pixel extracting section 18 in the direction vertical to the traveling direction of the swimmer, and generates the H profile data 30 corresponding to the image of the body based on the integration result. FIGS. 4A to 4C are illustrations of the H profile data 30. As shown in FIGS. 4A to 4C, the profile data generating section 20 divides all pixels 32 (see FIG. 4B) performed into each pixel row 32a along the direction vertical to the traveling direction of the swimmer 150 (see FIG. 4A), and calculates the integrated number of pixels composing each pixel row 32a. The profile data generating section 20 converts each pixel row 32a into one pixel 30a having a brightness value proportional to the integrated number, arranges the pixel converted one-dimensionally, and generates the H profile data 30 corresponding to the image of the body (see FIG. 4C).

The profile data group generating section 22 arranges each profile data 30 generated in the output order of the image data, and generates the H profile data group 34 on the D-T map in which the ordinate axis indicates time and abscissa axis indicates distance. FIG. 5 is the D-T map showing the H profile data group 34 generated. The D-T map displays a range of about 15 meters, and the H profile data group 34 shows that the swimmer appears from the left on the D-T map, and disappears right downward. Each type can be recognized automatically based on a difference in shape due to each type of profile data group generated.

An end point extracting section 24 extracts the end point corresponding to the end point in the traveling direction of the image of the body of the swimmer, that is, the front end point P based on the brightness value for each pixel 30a composing each H profile data 30 that is provided. As shown in FIG. 4C, the end point extracting section 24 extracts the pixel 30 max whose the brightness value is the highest in the H profile data 30, searches for each pixel 30a from the pixel 30 max extracted to the traveling direction side of the swimmer, and extracts the area between the pixels for which the brightness value decreases the most as the front end point P. The end point extracting section 24 may extract the front end point P as the edge position of the traveling direction side of the swimmer in the H profile data 30.

Figure 6:
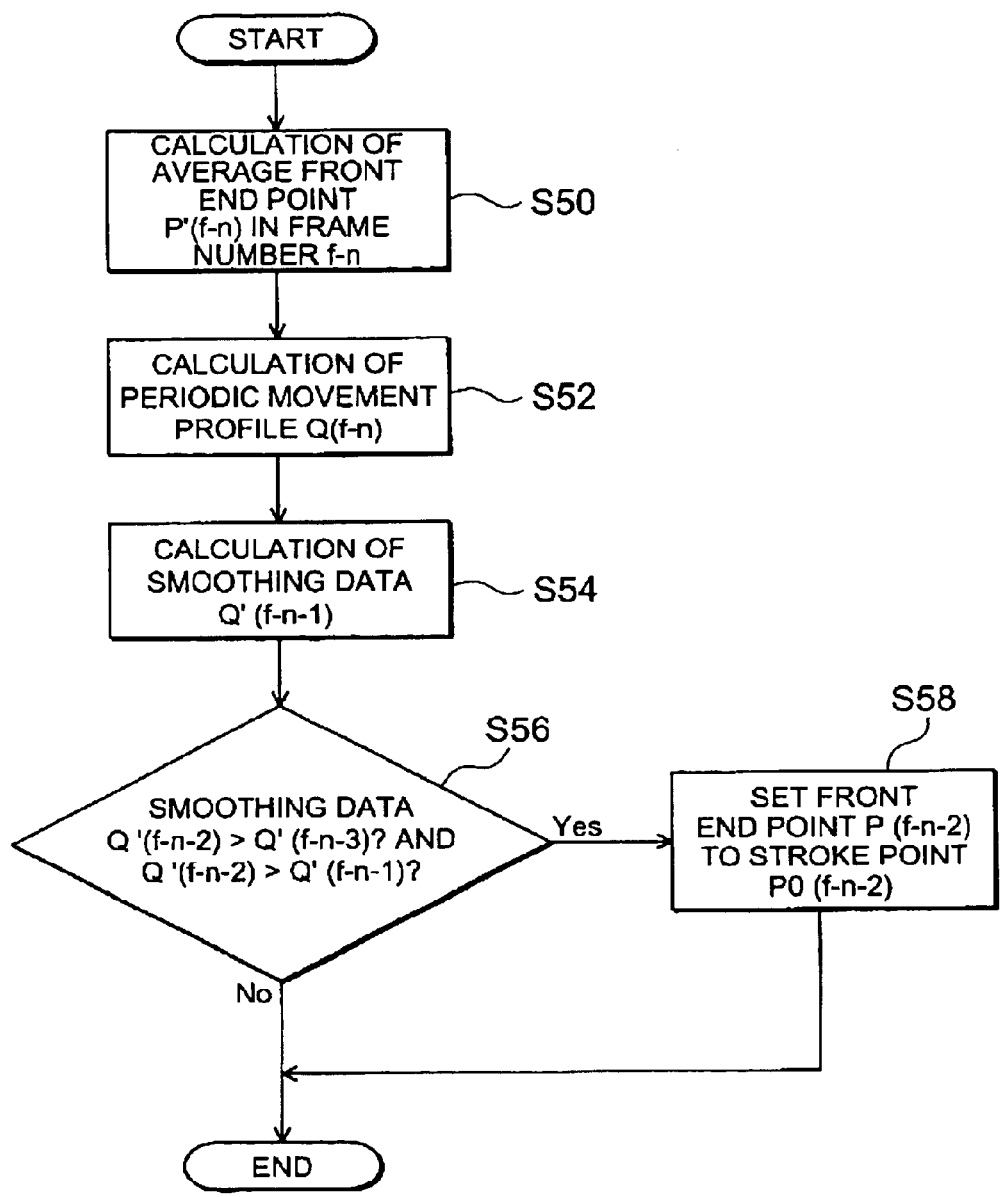
FIG. 6 is a flowchart showing the extracting processing of a stroke point by a stroke point extracting part.
Figure 7A:
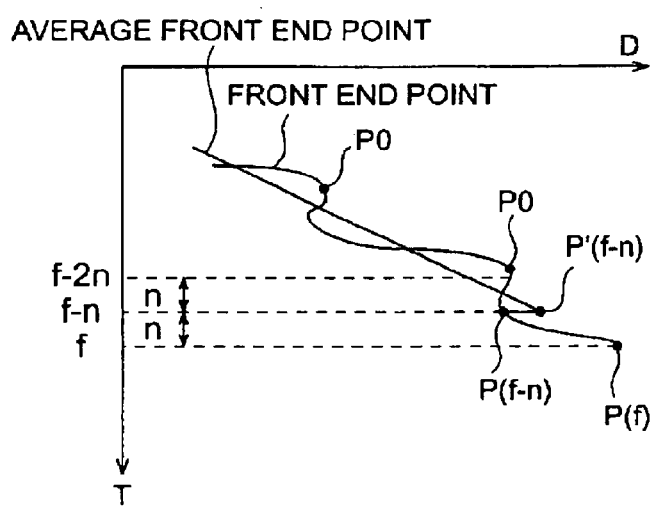
FIGS. 7A and 7B are illustrations of the profile of a periodic movement.
Figure 7B:
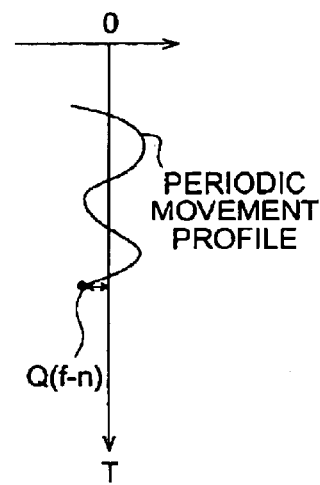

A stroke point extracting section 26 extracts the front end point P when the swimmer is in a predetermined posture (that is, the posture when the head rises highest in case of breaststroke and the posture when arm lands in water in other cases) for each stroke from each front end point P as the stroke point P0 based on the periodic change in the waveform (distance locus to time) formed by the front end point P extracted by the end point extracting section 24 in the D-T map showing the H profile data group 34. FIG. 6 is a flowchart showing the extracting processing of a stroke point P0 by a stroke point extracting section 26. FIG. 7A and FIG. 7B are illustrations of the profile of periodic movement.

When the frame number processed from the start of the image capturing to the present time is f, the average front end point from the present time to frame number f−n which is n frame earlier is determined by taking the average of the front end point in the frames from the present time to the 2n earlier. The frame number 2n in which the average is taken is set to at least more than the stroke time, and is set to 40 frames in the embodiment. As shown in FIG. 6, FIG. 7A and FIG. 7B, the average front end point P′ (f−n) in frame number f−n is calculated by (step S50) by extracting the front end point P (f) in the frame number f and by taking the average of the front end points P in the frame number from the present time to the 2n earlier. A difference between the front end point P (f−n) in the frame number f−n and the average front end point P′ (f−n) is adopted, and the periodic movement profile Q(f−n) is calculated (step S52). Thereby, the smoothing data Q′ (f−n−1) of Q (f−n−1) in the number f−n−1 of frames is calculated (step S54) The smoothing data Q′ (f−n−2) calculated and the smoothing data Q′ (f−n−3) are compared, and the smoothing data Q′ (f−n−2) and the smoothing data Q′ (f−n−1) are compared (step S56). Only when the smoothing data Q′ (f−n−2) is larger than the other, the front end point P (f−n−2) is set as the stroke point P0 (step S58)

In this manner, a more remarkable periodic change in the waveform can be exhibited by adopting a difference between the front end point P and the average front end point P′ and by calculation of the periodic movement profile Q. Therefore, the stroke point P0 can be accurately extracted based on the change in curvature of the periodic movement profile Q.

A calculating section 28 calculates the stroke information such as the stroke time and the stroke distance based on each stroke point P0 extracted by the stroke point extracting section 26, and outputs to a integrated display device 10. At this time, since the calculating section 28 receives the signal showing the official time output from an official timer 8 and corrects the stroke time, accurate stroke information can be calculated.

The time required and the distance traveled to extract a first stroke point P0 after the swimmer starts can be calculated as the time required for the start and the traveling distance from start in the calculating section 28. Thereby, the movement of the start of the swimmer, that is, the movement such as diving and submergence can be analyzed. Further, the time required and traveling distance between the stroke points P0 extracted just before and just after the turn of the swimmer are calculated as the time required for turn and traveling distance at a turn. Thereby, the movement of the turn of the swimmer can be analyzed.

Next, the movement of the stroke information measuring device 2 will be described, and a stroke information measuring method according to the embodiment of the present invention will be described.

First, the image data of the swimmer who is swimming, which has been captured by the imaging section 4 is output at each frame (that is, every ⅓₀), and is stored in the memory section 14 of the image processor 6. The signal showing the start of processing from the control section 16, becomes a trigger, and RGB/HSV conversion of all pixels for each pixel data is executed by the pixel extracting section 18. All pixels are made into binaries of the pixel corresponding to the image of the body and other pixels based on hue value, and the pixels corresponding to the image of the body are extracted.

The profile data generating section 20 performs the integration of the pixels corresponding to the image of the body in the direction vertical to the traveling direction of the swimmer. The profile data generating section 20 generates the H profile data 30 in which the pixels having the brightness value proportional to the integrated number are arranged one-dimensionally. Each H profile data 30 generated is arranged in the output order of the image data by the profile data group generating section 22, and the H profile data group 34 is generated on the D-T map.

The end point corresponding to the end part in the traveling direction of the image of the body of the swimmer, that is, the front end point P is extracted based on the brightness value having each pixel 30a composing each H profile data 30 by the end point extracting section 24. In the D-T map showing the H profile data group 34, the front end point P when the swimmer is in a predetermined posture for each stroke is extracted as a stroke point P0 from each end point P by the stroke point extracting section 26 based on the periodic change in the waveform formed by the front end point P extracted by the end point extracting section 24.

The stroke information such as the stroke time and the stroke distance are calculated by the calculating section 28 based on each stroke point P0, and is output to the integrated display device 10. At this time, in the calculating section 28, the stroke time is corrected based on the signal showing the official time output from the official timer 8. The time required and the distance advanced to extract a first stroke point P0 after the swimmer starts are calculated as the time required for start and the traveling distance at start by the calculating section 28. Further, the time required and traveling distance between the stroke points P0 extracted just before and just after the turn of the swimmer are calculated as the time required for a turn and traveling distance at a turn.

The front end point when the swimmer is in a predetermined posture for each stroke can be extracted as a stroke point P0 by the above stroke point measuring device 2, and the stroke time and stroke distance of the swimmer can be measured accurately and in real time.

The stroke point measuring device 2 extracts the end point corresponding to the end part in the traveling direction of the swimmer as the front end point P for each H profile data 30. Therefore, the front end point P is regarded as the front end of the body of the swimmer at the time when the profile data corresponds, and the time required for advancing a predetermined distance can be calculated. Therefore, the split time and swimming-speed between any given positions of the swimmer can be measured.

Figure 8A:
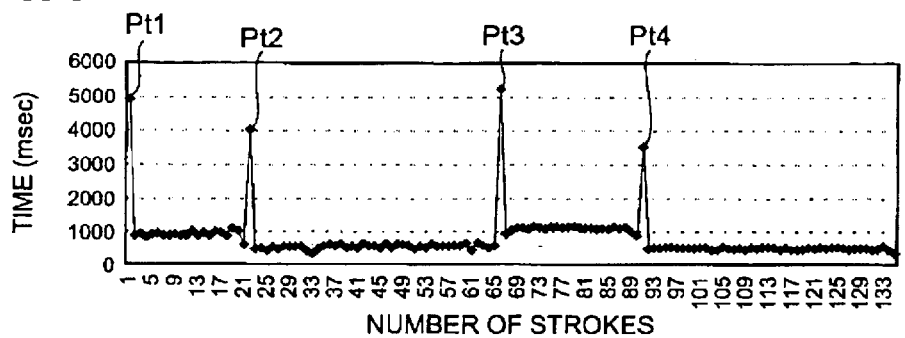
FIGS. 8A to 8C are illustrations showing stroke time, stroke distance and stroke speed.
Figure 8B:
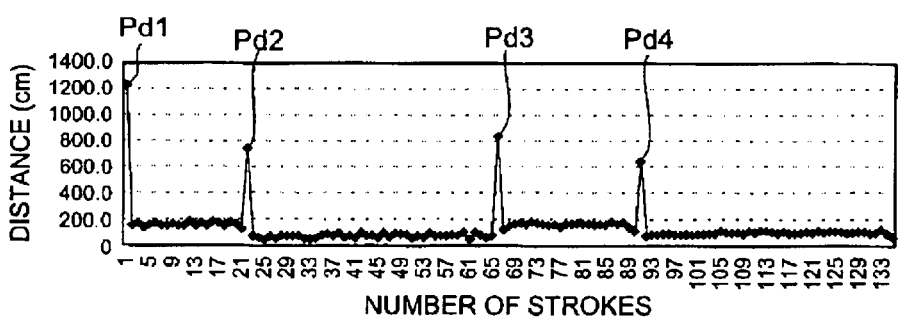
Figure 8C:
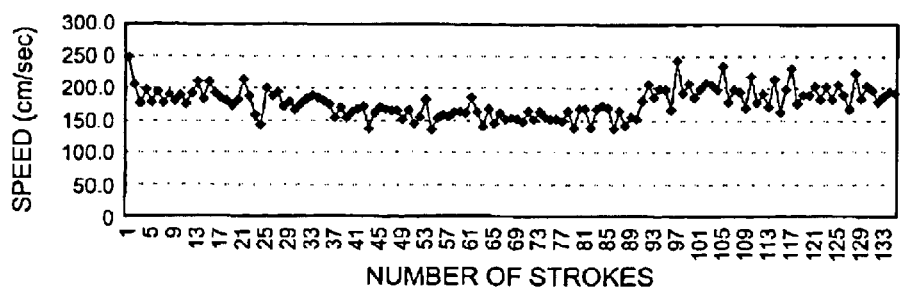

The data measured by the stroke point measuring device 2 can be in real time displayed on the display with which the integrated display device 10 is provided by the First Ethernet communication or the like. FIG. 8A through FIG. 8C are illustrations showing the stroke time (FIG. 8A) in a men's 200-meter individual medley, stroke distance (FIG. 8B) and stroke speed (FIG. 8C, average swimming-speed for each stroke), and an example of the display in the integrated display device 10. A point Pt 1 denotes time required for the start points Pt 2 to 4 denote time required for each turn, a point Pd 1 denotes traveling distance from the start and points Pd 2 to 4 denote traveling distance at each turn.

The data of a plurality of swimmers who are swimming can be displayed on the integrated display device 10 at the same time. Also, the past data of the swimmer and the data of other swimmers which are stored in the data storage disk 12 can be displayed and compared at the same time. Further, the real-time video data is input and the data can be overlay-displayed.

The embodiment according to the present invention has been described, but it is apparent that the present invention is not limited to the above embodiments.

For example, in the embodiment, the profile data generating section 20 performs the integration of the pixels corresponding to the image of the body in the direction vertical to the traveling direction of the swimmer to generate the H profile data. However the profile data generating section 20 may perform the integration of the pixels in the traveling direction of the swimmer to generate V profile data.

This is so because the end point of the V profile data periodically moves for each stroke and the end point when the swimmer is in a predetermined posture for each stroke from the V profile data as well as the H profile data can be extracted as a stroke point. If the H profile data and the V profile data are generated at the same time and the stroke point is extracted from the H profile data and the V profile data, a more accurate stroke time and stroke distance can be obtained.

INDUSTRIAL APPLICABILITY

The present invention is installed in training facilities or the like for race swimmers, and is suitable as a stroke information measuring device and a stroke information measuring method for evaluating the stroke of the swimmer.

What is claimed is:

1. A stroke information measuring device which captured images of a swimmer during swimming by using an imaging means and measures the stroke information of the swimmer based on the image data obtained, the stroke information measuring device comprising:

a pixel extracting means for extracting pixels corresponding to the image of the body of the swimmer in each image data obtained;

a profile data generating part for performing the integration of the pixels corresponding to the image of the body extracted by the pixel extracting means in a predetermined direction and generating the profile data corresponding to the body image;

an end point extracting means for extracting an end point of the body image from the profile data; and a stroke point extracting means for extracting a stroke point as the end point corresponding to the predetermined posture of the swimmer who is swimming based on the periodic movement of the end point.

2. The stroke information measuring device according to claim 1, wherein the profile data generating means performs the integration of the pixels corresponding to the image of the body extracted by the pixel extracting means along one of the traveling direction of the swimmer or the direction vertical to the traveling direction.

3. The stroke information measuring device according to claim 1, wherein the profile data generating means performs the integration of the pixels corresponding to the image of the body extracted by the pixel extracting means along both the traveling direction of the swimmer and the direction vertical to the traveling direction.

4. The stroke information measuring device according to any one of claims 1 to 3, further comprising a swimming-speed calculating means for calculating the swimming-speed of the swimmer based on the movement of the end point located at the front end in the traveling direction of the swimmer.

5. The stroke information measuring device according to any one of claims 1 to 3, further comprising a stroke information calculating means for calculating at least one of the time for each stroke of the swimmer, traveling distance for each stroke and average swimming-speed for each stroke based on the stroke point extracted.

6. The stroke information measuring device according to claim 5, wherein the stroke information calculating means calculates the time required for the start and traveling distance from the start based on the stroke point previously extracted after the swimmer starts.

7. The stroke information measuring device according to claim 5, wherein the stroke information calculating means calculates the time required for a turn and traveling distance at a turn based on the stroke point extracted just before and just after the turn of the swimmer.

8. A measuring method for measuring the stroke of a swimmer during swimming, the method comprising the steps of:

capturing images of the swimmer who is swimming to obtain image data of every predetermined time;

extracting the pixel corresponding to the body image of the swimmer from each image data obtained;

performing the integration of the pixels corresponding to the image of the body extracted in a predetermined direction to generate the profile data corresponding to the image of the body;

extracting the end point of the body image from the profile data; and extracting a stroke point as the end point corresponding to the predetermined posture of the swimmer who is swimming based on the periodic movement of the end point.

9. The stroke information measuring method according to claim 8, wherein the integration of the pixels corresponding to the image of the body extracted is performed along one of the traveling direction of the swimmer or the direction vertical to the traveling direction in the step of generating the profile data.

10. The stroke information measuring method according to claim 8, wherein the integration of the pixels corresponding to the image of the body extracted is performed along both the traveling direction of the swimmer and the direction vertical to the traveling direction in the step of generating the profile data.

11. The stroke information measuring method according to any one of claims 8 to 10, further comprising the step of calculating the swimming-speed of the swimmer based on the movement of the end point located at the front end in the traveling direction of the swimmer.

12. The stroke information measuring method according to any one of claims 8 to 10, further comprising the step of calculating at least one of the time for each stroke of the swimmer, traveling distance for each stroke and average swimming-speed for each stroke based on the stroke point extracted.

13. The stroke information measuring method according to claim 12, further comprising the step of calculating the time required for the start and traveling distance from the start based on the stroke point previously extracted after the swimmer starts.

14. The stroke information measuring method according to claim 12, further comprising the step of calculating the time required for a turn and traveling distance advanced at the turn based on the stroke point extracted just before and just after the turn of the swimmer.

* * * * *